United States Patent [19]

Johnson et al.

[11] Patent Number: 5,057,664
[45] Date of Patent: Oct. 15, 1991

[54] METHOD AND APPARATUS FOR LASER PROCESSING A TARGET MATERIAL TO PROVIDE A UNIFORMLY SMOOTH, CONTINUOUS TRIM PROFILE

[75] Inventors: Joel C. Johnson, Lake Oswego; Ho W. Lo, Portland; David Rowley; Terri J. Irland, both of Aloha, all of Oreg.

[73] Assignee: Electro Scientific Industries, Inc., Portland, Oreg.

[21] Appl. No.: 424,802

[22] Filed: Oct. 20, 1989

[51] Int. Cl.$^5$ .............................................. B23K 26/00
[52] U.S. Cl. ............................ 219/121.69; 219/121.72
[58] Field of Search ...................... 219/121.67, 121.68, 219/121.69, 121.72, 121.74, 121.75

[56] References Cited

U.S. PATENT DOCUMENTS

| | | | |
|---|---|---|---|
| 4,547,651 | 10/1985 | Maruyama | 219/121.67 |
| 4,634,831 | 1/1987 | Martinen et al. | 219/121.67 |
| 4,656,635 | 4/1987 | Baer et al. | 372/71 X |
| 4,734,912 | 3/1988 | Scerbak et al. | 372/71 X |
| 4,761,786 | 8/1988 | Baer | 372/10 |
| 4,908,493 | 3/1990 | Susemihl | 219/121.67 |

OTHER PUBLICATIONS

Sipe et al., "Laser-Induced Periodic Surface Structure", *The American Physical Society*, pp. 1141-1154 (Jan. 15, 1983).
Young et al., "Laser-Induced Periodic Surface Structure", *The American Physical Society*, pp. 1155-1172 (Jan. 15, 1983).
Keilman et al., "Periodic Surface Structures Frozen into $CO_2$ Laser-Melted Quartz", Applied Physics A. pp. 9-18 (1982).
Welch, "Concepts of Polarization Physics", *Laser & Applications*, pp. 67-71 (Jan. 1986).
Boyd et al., "Various Phase Transitions and Changes in Surface Morphology of Crystalline Silicon Induced by 4-260-ps Pulses of 1-m Radiation", *Appl. Phys. Lett.*, vol. 45, No. 1, pp. 80-82, (Jul. 1, 1984).
Ehrlich et al., "Time-Resolved Measurements of Stimulated Surface Polariton Wave Scattering and Grating Formation in Pulsed-Laser-Annealed Germanium", *Appl. Phys. Lett.*, vol. 41, No. 7, pp. 630-632, (Oct. 1, 1982).

*Primary Examiner*—C. L. Albritton
*Attorney, Agent, or Firm*—Stoel Rives Boley Jones & Grey

[57] ABSTRACT

A diode-pumped laser system (10) incorporates a polarization state control device (12) that provides a trim profile (84) having minimal striations (64) on a target material (42). The striations run generally parallel to the polarization direction of laser output light beam (L) and are diminished whenever the polarization direction is parallel to the laser trimming direction. The striations are substantially eliminated by circularly or randomly polarizing the laser output light beam.

20 Claims, 3 Drawing Sheets

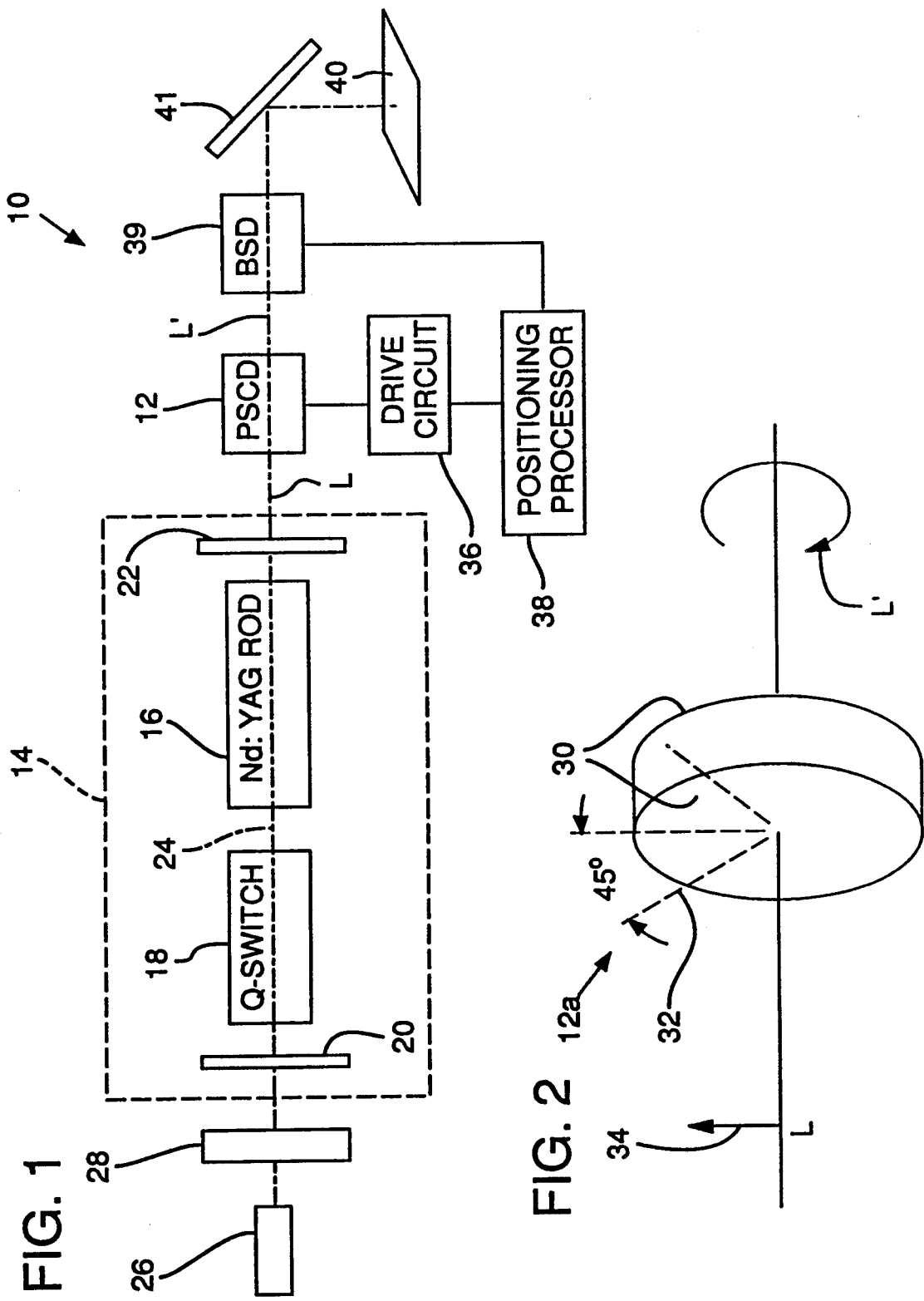

METHOD AND APPARATUS FOR LASER PROCESSING A TARGET MATERIAL TO PROVIDE A UNIFORMLY SMOOTH, CONTINUOUS TRIM PROFILE

TECHNICAL FIELD

The present invention relates to applications for laser systems and, in particular, to a method and an apparatus that use a laser to form a uniformly smooth, continuous trim profile along a trimming path on a target material.

BACKGROUND OF THE INVENTION

Certain laser systems perform laser processing operations on target materials, such as trimming thin-film resistors or repairing defective integrated circuits. The following background information is presented herein only by way of example with reference to the use of a compact Q-switched YAG laser to trim a thin-film resistor.

A thin-film resistor typically is made from nichrome or tantalum nitride and has a depth of typically less than 1.0 micron. The geometry of a trimming path in an electrically conductive material affects the resistance value of the thin-film resistor. To provide a thin-film resistor of a desired value of resistance, a trim may, therefore, require either a non-linear path, which would often be of sinusoidal shape, or two or more non-parallel straight line paths, which would often be orthogonal to each other. The resulting trim should be relatively smooth and continuous along the length of the trimming path to prevent unpredictable variations in resistance.

Recent advances in laser technology favor the use of compact diode-pumped Q-switched lasers over arc-pumped lasers in most laser processing applications. (A design description of compact diode-pumped Q-switched laser is set forth in U.S. Pat. No. 4,761,786 of Baer.) For example, unlike arc-pumped lasers, diode-pumped lasers are generally smaller and offer more reliable light pulse emissions. Diode-pumped lasers are also more durable, require considerably less operating power, and eliminate the need for a water cooling system. The use of such a laser to perform trimming operations is, therefore, advantageous and desirable.

SUMMARY OF THE INVENTION

An object of the present invention is, therefore, to provide a method and an apparatus that use a laser to process a target material and form a uniformly smooth, continuous trim profile along a trimming path in the target material.

Another object of this invention is to provide a laser system capable of achieving such a trim profile along a trimming path in any shape or direction on a target material.

A further object of this invention is to provide such a method and an apparatus that use a compact diode-pumped Q-switched laser to trim or repair a target material.

The present invention is the result of applicants' observation of subsurface striations or bar-like patterns present along the trimming paths formed during trimming operations on a thin-film material by a linearly polarized light beam produced by a compact diode-pumped Q-switched YAG laser. An investigation revealed the following information about the cause of the nonuniform trim profile. The pitch of the striation was independent of both the rate and direction of light beam travel across the substrate; and the orientation of the striation remained fixed regardless of the trimming direction and depended only upon the polarization direction of the light beam. In other words, the bars of the striation ran parallel to the electric field vector characterizing the beam.

Striations were minimally discernible in trims achieved by a single, physically isolated light pulse. A single light pulse is of minimal utility, however, because conventional laser systems for trimming resistors typically use a train of overlapping light pulses to remove electrically conductive material from a target surface. Each successive pulse in the pulse train effectively "nibbles" through only a small portion of the target material. Striations are, however, rather prominent when individual pulses overlap preceding pulses by about 80%. Finally, the presence of striations was minimized whenever the direction of the trim was parallel to the polarization direction of the light beam.

Applicants theorize that the striations found in the trims produced by compact diode-pumped Q-switched YAG lasers are inherent in the use of short length cavities typically associated with such lasers. The problem has, however, apparently not been addressed by manufacturers of conventional polarized arc-pumped YAG lasers. The longer cavities of the arc-pumped lasers may generate numerous longitudinal modes that tend to wash out the polarization-caused striations that plague the trims produced by the linearly polarized light output of diode-pumped Q-switched YAG lasers. Arc-pumped lasers have not, therefore, required striation prevention polarization state control devices at the outputs.

A compact diode-pumped laser of the present invention employs, therefore, a polarization state control device at the laser output to maintain a light beam in a polarization state with a polarization component of sufficient magnitude in the direction of the trimming path to prevent the formation of striation patterns and thereby provide a uniform trim profile along the trimming path.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 1 is a schematic diagram of a diode-pumped laser system incorporating a polarization state control device for minimizing striation patterns in a target material in accordance with the present invention.

FIG. 2 shows the polarization state changing effect of a quarter-wave plate used as a polarization control device in the laser system of FIG. 1.

DETAILED DESCRIPTION OF PREFERRED EMBODIMENT

Figure 3:
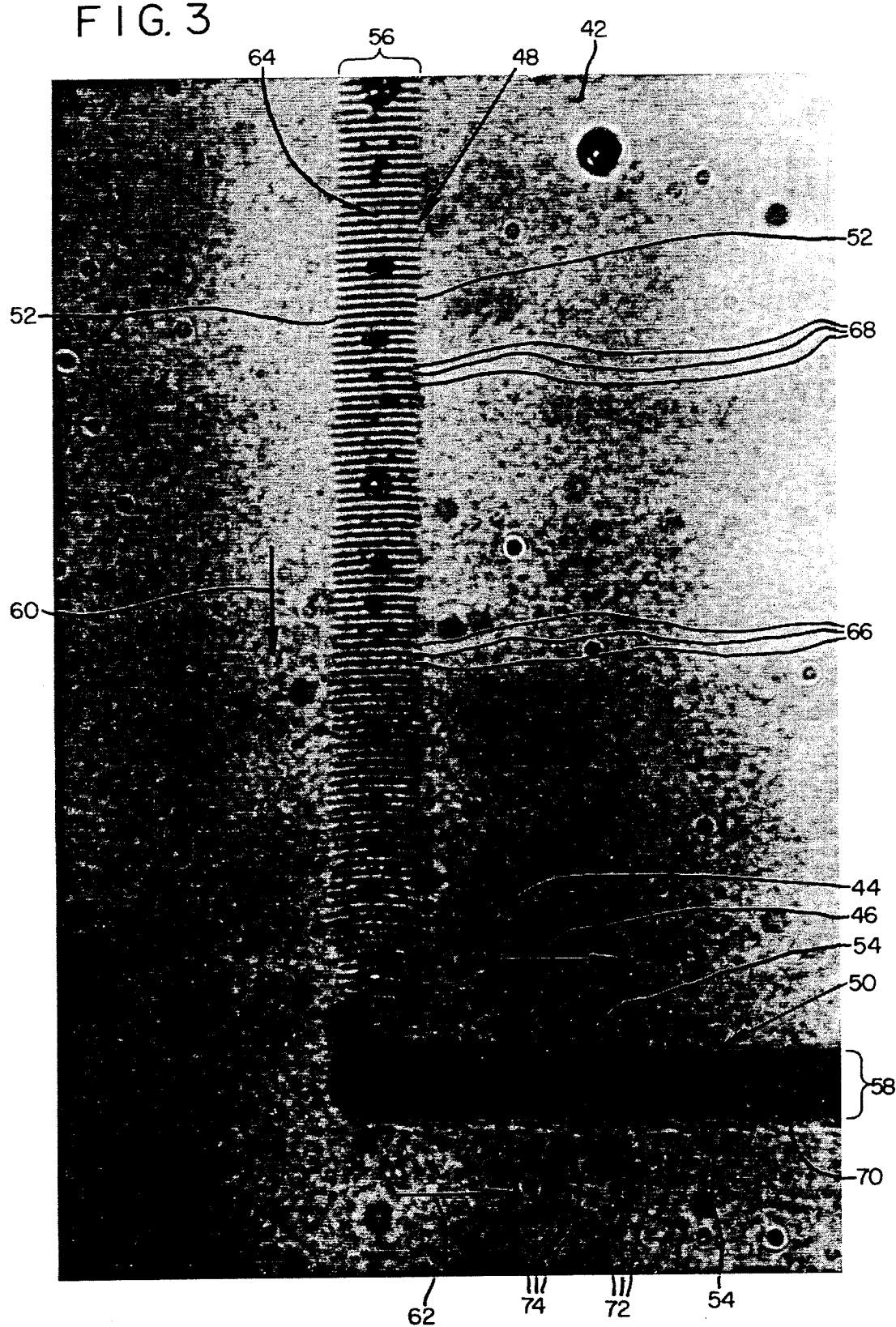
FIG. 3 is a photograph showing a trim profile made by a compact Q-switched diode-pumped YAG laser emitting substantially linearly polarized light.

FIG. 1 is a block diagram of a diode-pumped Q-switched laser system 10 incorporating a polarization state control device (PSCD) 12 in accordance with the present invention. Laser system 10 is of the "compact" type having a short length cavity 14 with dimensions approximately of the size described in U.S. Pat. No. 4,761,786 of Baer. A solid state Nd:YAG laser rod 16 and a Q-switch 18 are positioned within cavity 14 between a pair of mirrors 20 and 22 along a beam axis 24. Persons skilled in the art will appreciate that the solid state rod may also be of the YLF type or of other solid state material. Laser system 10 also includes a diode-pumped light source 26 located on the opposite side of mirror 20 from laser rod 16 and aligned along beam axis 24. A lens system 28 of conventional design is interposed between cavity 14 and light source 26 and positioned along beam axis 24. Lens system 28 collimates, focuses, or corrects the light emitted by light source 26.

Typically, light source 26 emits linearly polarized output light, or a linear polarizing element is interposed between cavity 14 and light source 26. Skilled persons will appreciate that laser system 10 may be pumped in a variety of ways. For example, light source 26 may be positioned perpendicular to instead of along beam axis 24 to allow pumping from the side of laser cavity 14.

Mirror 20 transmits most of the light emitted by light source 26 and reflects most of the light emitted by laser rod 16, and mirror 22 transmits part of the light emitted by laser rod 16. Acousto-optic Q-switch 18 positioned between mirror 20 and laser rod 16 modulates radiation intensity produced by laser rod 16 at a switching rate determined by a control circuit (not shown). Skilled persons will appreciate that Q-switch 18 may alternatively be positioned between mirror 22 and laser rod 16.

FIG. 2 shows a quarter-wave plate 12a that may be used as the polarization control device 12, shown in FIG. 1. Quarter-wave plate 12a is positioned so that its light communicating surfaces 30 are disposed perpendicular to beam axis 24. Quarter-wave plate 12a is oriented so that its optic axis 32 is displaced 45 degrees relative to the polarization direction 34 of the incident light beam L. Quarter-wave plate 12a decomposes incident light beam L into orthogonal extraordinary and ordinary components of equal intensity and thereby develops a circularly polarized light beam L'. Circularly polarized light beam L' has a light intensity component of sufficient magnitude in the trimming direction to minimize striation formations.

With reference to FIG. 1, polarization control device 12 may also be implemented as a variable optical retarder, such as a Pockel's cell, or a controllable polarization rotation device, such as a twisted nematic liquid crystal cell or a Faraday rotator. A variable optical retarder or a controllable polarization rotation device changes the polarization state of incident light in response to the magnitude of a polarization state control signal delivered from a drive circuit 36.

Drive circuit 36 conditions the polarization state control signal, which drive circuit 36 receives from a beam positioning processor 38. Beam positioning processor 38 also provides a beam positioning signal to a beam steering device (BSD) 39 that controls the trimming direction light beam L' follows along the surface of a target 40. In addition, a reflecting mirror 41 may be used to change the direction of light beam L'. Beam steering device 39 can be, for example, a galvanometer based beam positioner or other device known to those having ordinary skill in the art. There is a one-to-one correspondence between the magnitude of the polarization state control signal and the beam positioning signal such that the polarization direction of light beam L' is maintained generally parallel to its trimming path. The position of light beam L' relative to the target material is preferably achieved by moving the beam position relative to a stationary target surface, irrespective of the type of polarization control device 12 being used. Alternatively, a crystal quartz, wedged wave plate may be used as polarization control device 12 to provide "pseudo" randomly polarized light. Randomly polarized light typically has a polarization component of sufficient magnitude in the direction of the trimming path to provide a uniform trim profile.

FIG. 3 shows a photograph of a target material 42 having a right angle subsurface trim profile 44 produced by a diode-pumped Q-switched YAG laser (laser system 10 without polarization control device 12) emitting a light beam that is linearly polarized in a direction 46. Trim profile 44 is made from two trimming paths 48 and 50 having edge portions 52 and 54 and line portions 56 and 58, respectively.

Trimming path 48 runs along a trim direction 60 that is substantially orthogonal to polarization direction 46, and trimming path 50 runs along a trim direction 62 that is substantially parallel to polarization direction 46. Trimming path 48 defines a transverse striation pattern, and trimming path 50 defines a longitudinal striation pattern.

Line portion 56 of trimming path 48 exhibits transverse striations 64 having alternating insulating bars 66 and conductive bars 68. Insulating bars 66 and conductive bars 68 represent areas where the nichrome within target material 42 has and has not been dissipated by the light beam, respectively. Conductive bars 68 are electrically conductive across the line portion 56 of trimming path 48 and create electric fields that cause variations in the electrical resistance of target material 42. Edge portions 52 of trimming path 48 are nonuniformly curved and may also affect the value of the electrical resistance of target material 42. In addition, edge portion 52 is insufficiently smooth or straight for applications in which smoothness and straightness are critical characteristics for laser processed target materials.

Line portion 58 of trimming path 50 exhibits longitudinal curvilinear striations 70 that partly resemble striations 64. Curvilinear striations 70 have alternating insulating bars 72 and conductive bars 74 that represent areas where the nichrome within target material 42 has and has not been completely dissipated by the light beam, respectively. Bars 72 and 74 are not so prominent or distinct as bars 66 and 68 of trimming path 48. Bars 72 and 74 run substantially parallel to both polarization direction 46 and trim direction 62. Bars 74 are substantially electrically nonconductive across line portion 58, but may still slightly affect the electrical resistance of target material 42. Edge portions 54 of trimming path 50 are straighter than edge portions 52 of trimming path 48 and are suitable for some laser processing applications.

Figure 4:
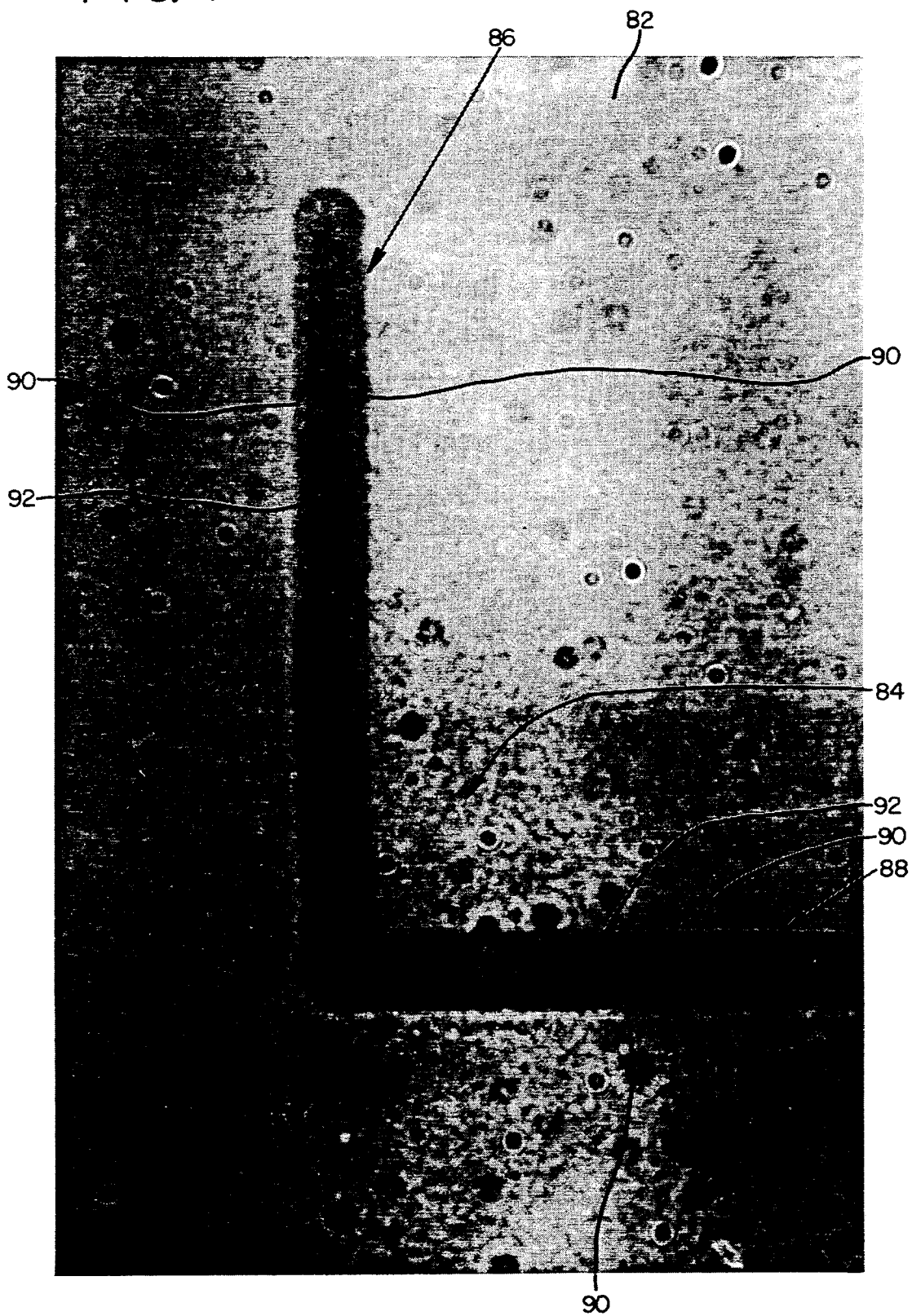
FIG. 4 is a photograph showing a trim profile made by a compact Q-switched diode-pumped YAG laser emitting substantially circularly polarized light.

FIG. 4 shows a photograph of target material 82 having a right angle trim subsurface profile 84 produced by laser system 10 incorporating polarization control device 12a, which emits a circularly polarized light beam. Trim profile 84 is made from two trimming paths 86 and 88 having relatively straight edge portions 90 and relatively smooth line portions 92. Neither striations 64 nor curvilinear striations 70 of trim profile 44 are evident in trim profile 84.

Target materials 42 and 82 comprise a passivated silicon dioxide layer deposited on a nichrome, substrate, but skilled persons will appreciate that other target materials such as passivated silicon dioxide deposited on tantalum nitride would have yielded similar photographs when subjected to the same test conditions. Skilled persons will also appreciate that the envelope defined by trim profile 84 could be sinusoidal in shape without a noticeable change to its smoothness or continuity. On the other hand, had the envelope defined by trim profile 44 been of sinusoidal shape, the photograph of FIG. 3 would have displayed varying degrees of striation along the trimming path as dictated by the differences between the trimming path direction and the polarization direction of the light beam.

The superior trimming performance of the polarization controlled compact diode-pumped YAG lasers permit substantially striation-free trim profiles on target materials and, therefore, enable the consistent production of thin-film resistors having predictable, predetermined resistance values.

It will be obvious to those having ordinary skill in the art that various changes may be made in the details of the above-described preferred embodiment of the present invention without departing from the underlying principles thereof. The scope of the present invention should, therefore, be determined only by the following claims.

We claim:

1. A method of laser trimming a target material to provide a uniform trim profile, comprising:
   directing a light beam emitted by a compact diode-pumped solid-state laser toward the surface of a thin-film target material;
   moving the light beam and the target material relative to each other in a direction along the surface of the thin-film target material to form a trimming path; and
   imparting to the light beam a polarization state with a polarization component of sufficient magnitude in the direction of the trimming path to substantially prevent the formation of a prominent striation pattern along the trimming path of the thin-film target material and thereby provide a uniform trim profile.

2. The method of claim 1 in which the light beam is in a circularly polarized state.

3. The method of claim 1 in which the light beam is in a randomly polarized state.

4. The method of claim 1 in which the light beam is in an elliptically polarized state defined by major and minor polarization axes, and the polarization component in the direction of the trimming path corresponds to the major polarization axis.

5. The method of claim 1 in which the polarization state of the light beam is established by a polarization state control device that changes the polarization state of an incident light beam in accordance with the direction of the trimming path.

6. The method of claim 1 in which the diode-pumped laser is of a YAG type.

7. The method of claim 1 in which the diode-pumped laser is of a YLF type.

8. The method of claim 1 in which a quarter-wave plate imparts the polarization state to the light beam.

9. The method of claim 1 in which a wedged wave plate imparts the polarization state to the light beam.

10. The method of claim 1 in which the critical dimensions of the light beam are not adversely affected during trim profile formation.

11. The method of claim 6 in which the light beam is in a circularly polarized state.

12. The method of claim 6 in which the light beam is in a randomly polarized state.

13. The method of claim 6 in which the light beam is in an elliptically polarized state defined by major and minor polarization axes, and the polarization component in the direction of the trimming path corresponds to the major polarization axis.

14. The method of claim 6 in which a quarter-wave plate imparts the polarization state to the light beam.

15. The method of claim 6 in which a wedged wave plate imparts the polarization state to the light beam.

16. The method of claim 7 in which the light beam is in a circularly polarized state.

17. The method of claim 7 in which the light beam is in a randomly polarized state.

18. The method of claim 7 in which the light beam is in an elliptically polarized state defined by major and minor polarization axes, and the polarization component in the direction of the trimming path corresponds to the major polarization axis.

19. The method of claim 7 in which a quarter-wave plate imparts the polarization state to the light beam.

20. The method of claim 7 in which a wedged wave plate imparts the polarization state to the light beam.

* * * * *